US006523053B1

(12) United States Patent
Lee et al.

(10) Patent No.: US 6,523,053 B1
(45) Date of Patent: Feb. 18, 2003

(54) METHOD AND APPARATUS FOR DIVIDING LONG POLYNOMIAL EXPRESSION IN FINITE FIELD

(75) Inventors: Kwy Ro Lee, Taejon-si (KR); Hyung Joon Kwon, Seoul (KR)

(73) Assignee: Korea Advanced Institute of Science & Technology, Taejon-si (KR)

( * ) Notice: Subject to any disclaimer, the term of this patent is extended or adjusted under 35 U.S.C. 154(b) by 0 days.

(21) Appl. No.: 09/383,792

(22) Filed: Aug. 26, 1999

(30) Foreign Application Priority Data

Sep. 3, 1998 (KR) .......................................... 98-036306

(51) Int. Cl.[7] .............................................. G06F 7/72
(52) U.S. Cl. ...................................................... 708/492
(58) Field of Search ................................. 708/492, 491

(56) References Cited

U.S. PATENT DOCUMENTS 5,367,479 A * 11/1994 Van Der Putten ........... 708/492
5,905,664 A * 5/1999 Ko et al. ..................... 708/491

OTHER PUBLICATIONS

A Systolic Reed–Solomon Encoder by Gadiel Seroussi; IEEE Transactions on Information Theory, vol. 37, No. 4 Jul. 1991. pp. 1217–1220.

The VLSI Implementation of a Reed–Solomon Encoder using Berlekamp's Bit–Serial Multiplier Algorithm; by In–Shek Hsu et al.; IEEE Transactions on Computers, vol. C–33, No. 10, Oct. 1984, pp. 906–911.

* cited by examiner

Primary Examiner—David H. Malzahn
(74) Attorney, Agent, or Firm—Bachman & LaPointe, P.C.

(57) ABSTRACT

A method and apparatus for dividing a long polynomial expression in a finite field. Elements in a dividend polynomial are grouped into a plurality of groups and combined according to a superposition of the finite field. Then, a group-based parallel processing operation is performed with respect to the combined results on the basis of a lookahead technique and a partial-division process to sequentially remove the groups up to the last one for inter-symbol division in the finite field. A first group storage block stores the first one of the groups and an intermediate group storage block adds partial-remainders from the previous and current groups to form a new intermediate group. A remainder generation block adds partial-remainders from the previous and last groups to generate the overall remainder. A partial-quotient generation block generates partial-quotients in response to output data from the first group storage block and intermediate group storage block. A partial-remainder generation block generates partial-remainders in response to input data to the partial-quotient generation block.

3 Claims, 15 Drawing Sheets

METHOD AND APPARATUS FOR DIVIDING LONG POLYNOMIAL EXPRESSION IN FINITE FIELD

BACKGROUND OF THE INVENTION

1. Field of the Invention

The present invention relates in general to an algorithm for division of a long polynomial expression in a finite field and a hardware architecture for the same, and more particularly to a method and apparatus for dividing a long polynomial expression in a finite field, in which a group-based parallel processing operation is performed on the basis of a lookahead technique and a partial division process, so that no inter-symbol multiplication is required in the finite field, resulting in the production of a relatively large throughput per unit time as compared with the conventional one.

2. Description of the Prior Art

Generally, long polynomial expression division methods have essentially been required for a variety of applications such as an error correction code or data coding method in various fields of electronics including a computer, communication, optical magnetic disk, control system, etc. Such a conventional long polynomial expression division method is shown in FIG. 1 herein. As shown in this drawing, the conventional long polynomial expression division method is implemented using a linear feedback shift register which performs a symbol-based serial process.

However, the above-mentioned conventional method has a disadvantage in that the symbol-based serial process cannot be effected at high speed because it is fully dependent on a degree of a dividend polynomial.

As a high-speed requirement for high-capacity video compression and a low-power requirement for portable information equipment increase, the conventional hardware architecture employing the linear feedback shift register has shown several limitations as follows.

Firstly, the throughput is limited by a degree of a dividend polynomial. This makes high-speed processing impossible. Secondly, the presence of a global feedback signal imposes severe constraints on a switching speed and necessitates the use of a global clock.

Thirdly, the high-speed condition and the low-power consumption condition cannot be satisfied concurrently. Fourthly, the feedback signal limits the degree of parallelism that can be exploited for low-power consumption. Finally, the complete linear feedback shift register and serial buffer registers providing inputs to the shift register and receiving outputs thereof should be clocked for every clock cycle without concern for the change of contents therein.

Therefore, for high-speed/low-power applications, there are required a new polynomial expression division algorithm and the associated architecture which do not suffer the above-mentioned limitations.

SUMMARY OF THE INVENTION

Therefore, the present invention has been made in view of the above problems, and it is an object of the present invention to provide a method and apparatus for dividing a long polynomial expression in a finite field, in which a group-based parallel processing operation is performed on the basis of a lookahead technique and a partial division process, so that no inter-symbol multiplication is required in the finite field, resulting in the production of a relatively large throughput per unit time as compared with the conventional one.

In accordance with one aspect of the present invention, there is provided a method for dividing a long polynomial expression in a finite field, comprising the first step of grouping elements in a dividend polynomial into a plurality of groups; the second step of combining the groups according to a superposition of the finite field; and the third step of performing a group-based parallel processing operation with respect to the combined results on the basis of a lookahead technique and a partial-division process to sequentially remove the groups up to the last one for inter-symbol division in the finite field.

In accordance with another aspect of the present invention, there is provided an apparatus for dividing a long polynomial expression in a finite field, which performs a group-based parallel processing operation on the basis of a lookahead technique and a partial-division process to sequentially remove groups in a dividend polynomial up to the last one for inter-symbol division in the finite field, comprising first group storage means for storing the first one of the groups, the first group storage means including k+1 first symbol registers, each of the first symbol registers including a D flip-flop on the basis of the fact that one symbol is composed of one bit in a binary field; X intermediate group storage means, each of the intermediate group storage means including k first symbol adders for adding partial-remainders from the previous and current groups, k second symbol registers for storing outputs of the first symbol adders, respectively, and a third symbol register for storing a lowest-order symbol from the current group; remainder generation means for adding partial-remainders from the previous and last groups to generate the overall remainder, the remainder generation means including k second symbol adders for adding the partial-remainders from the previous and current groups, and k fourth symbol registers for storing outputs of the second symbol adders, respectively; X+1 partial-quotient generation means connected respectively to the first group storage means and the X intermediate group storage means for generating partial-quotients in response to output data from the first group storage means and intermediate group storage means; and X+1 partial-remainder generation means connected respectively to the first group storage means and the X intermediate group storage means for generating partial-remainders in response to input data to the X+1 partial-quotient generation means, transferring the generated partial-remainders respectively to the intermediate group storage means which are arrayed on the same lines as those thereof, and transferring the lowest-order one of the partial-remainders to the remainder generation means.

In accordance with yet another aspect of the present invention, there is provided an apparatus for dividing a long polynomial expression in a finite field, which performs a group-based parallel processing operation on the basis of a lookahead technique and a partial-division process to sequentially remove groups in a dividend polynomial up to the last one for inter-symbol division in the finite field, comprising intermediate group storage means including k symbol adders for adding partial-remainders from the previous and current groups, k first symbol registers for storing outputs of the symbol adders, respectively, and a second symbol register for storing a lowest-order symbol from the current group; partial-quotient generation means connected to the intermediate group storage means for generating partial-quotients in response to output data from the intermediate group storage means; and partial-remainder generation means connected to the intermediate group storage means for generating partial-remainders in response to input data to the partial-quotient generation means and feeding the generated partial-remainders back to the intermediate group storage means.

First, the technical concept of the present invention will be mentioned briefly. The present invention proposes a division architecture capable of performing a group-based parallel processing operation on the basis of a technique called "lookahead of partial-remainder (LAPR)". The group-based parallel processing operation is performed on the basis of a lookahead technique and a partial division process, resulting in no inter-symbol multiplication being required in the finite field, leading to a highly increased throughput per unit time as compared with the conventional one. As a result, lowering a clock frequency being used enables a trade-off between the high operation speed and the low power consumption. The use of the lowered clock frequency also allows a supply voltage to be reduced, resulting in a larger amount of power consumption being saved.

The ability to reduce power consumption is based on the fact that there can be a trade-off between a silicon area and power consumption. Because a trade-off mechanism such as a parallel architecture, a pipelined architecture, etc. can be provided, a low frequency clock can be used and the associated low-voltage operation can be performed, as well as maintaining the throughput to a desired level.

However, this approach is able to obtain the minimum power at a given performance level, but difficult to obtain high performance. As a result, it has a limitation in attaining both of the two objects, high performance and low power consumption.

Therefore, on the basis of the fact that the low power consumption and high operation speed can be obtained at one time on the assumption that an algorithm is particularly tuned to a given function to increase the operation speed, the present invention provides a new long polynomial expression division method and apparatus which will be described later in detail with reference to the accompanying drawings.

In other words, the above-mentioned low power consumption strategies are based on the fact that power consumption of a CMOS digital system is proportioned to the square of a supply voltage, a clock frequency being used and an entire capacitance. Namely, a point to be considered in the algorithm and architecture level design for the reduction of power is to increase throughput per unit time as far as possible and lower the used clock frequency to a level corresponding to the increased throughput. Lowering the used clock frequency relaxes a timing limitation, resulting in the provision of a mechanism to reduce the supply voltage, followed by an additional power saving effect.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

A conventional process for dividing a polynomial expression in a finite field is to sequentially one by one remove elements in a dividend polynomial from the highest-order coefficient using a multiplication of a selected quotient and a divisor polynomial until a degree of a remainder polynomial becomes smaller than that of the divisor polynomial.

However, a new division algorithm proposed by the present invention is to sequentially remove groups in a dividend polynomial up to the last group using a "lookahead" technique. That is, the present LAPR division algorithm performs a group-based parallel processing operation whereas the conventional division algorithm performs a bit or symbol-based serial processing operation.

The present division algorithm starts from the definition of P(x) as a long arbitrary dividend polynomial of degree n and M(x) as a fixed divisor polynomial of degree k as follows:

$$P(x) = \sum_{i=0}^{n} p_i x^i \quad M(x) = \sum_{i=0}^{k} m_i x^i \quad \text{[Equation 1]}$$

Defining an arbitrary variable q as the maximum number that satisfies the following equation 2, then elements in the dividend polynomial can be grouped into q+2 orthogonal groups as in the below equation 3:

$$n \geq q(k+1)+k \quad \text{[Equation 2]}$$

$$P(x) = \sum_{i=0}^{q} p_i(x) x^{i(k+1)} + P_{-1}(x) \quad \text{[Equation 3]}$$

All of the groups $P_j(x)$ (where, $q \geq j \geq 0$) have the same degree, and they also have the same format as that of a fundamental polynomial S(x) which can be expressed in the following equation (4):

$$S(x) = \left(\sum_{i=0}^{k} s_i x^i\right) x^k \quad \text{[Equation 4]}$$

The fundamental polynomial S(x) expressed in the above equation (4) is dependent not on the dividend polynomial P(x) but on the divisor polynomial M(x).

Figure 1:
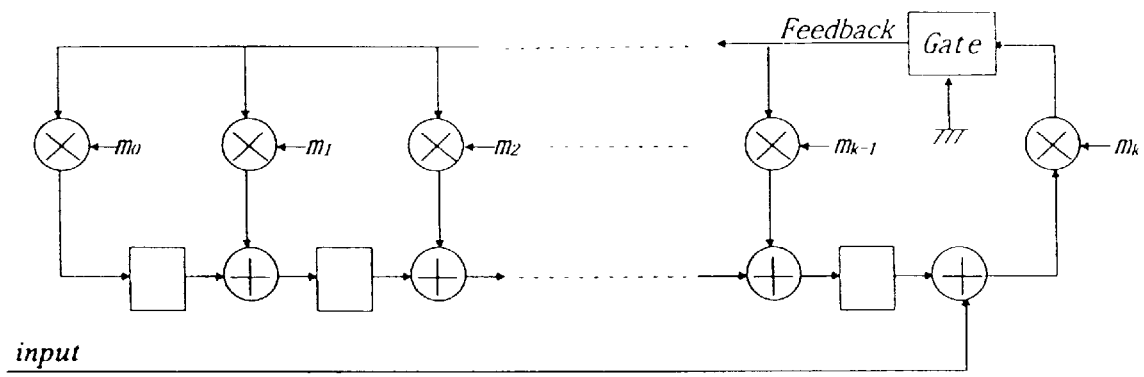
FIG. 1 is a view showing the construction of a conventional long polynomial expression division hardware using a linear feedback shift register.
Figure 2:
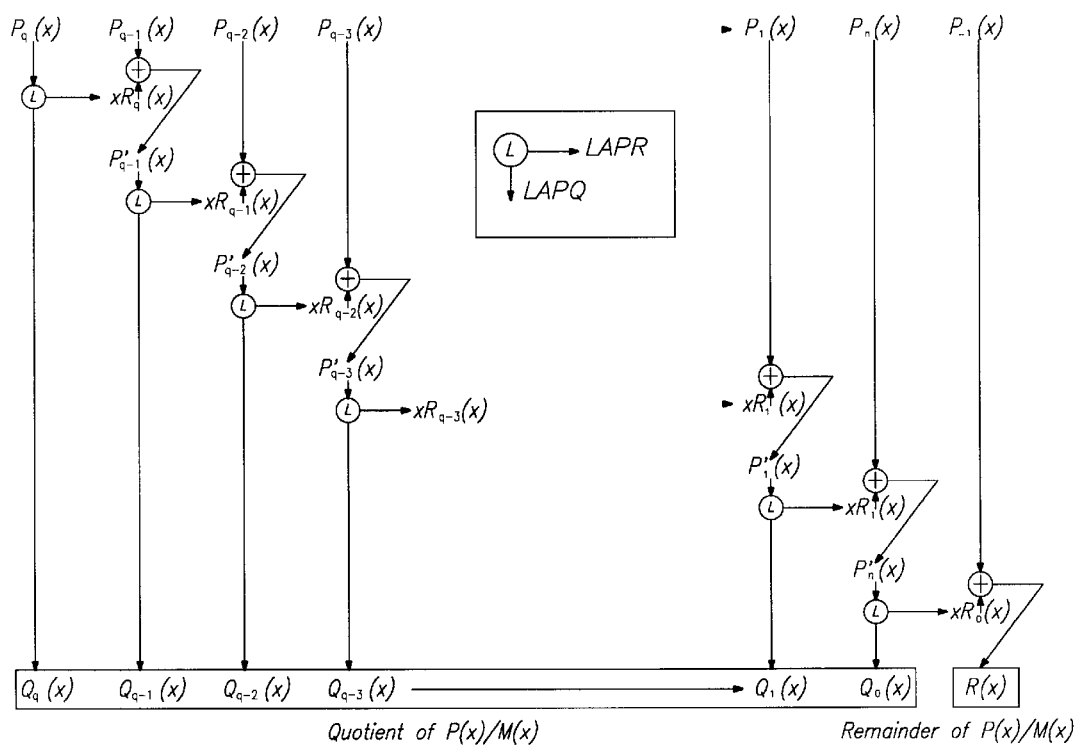
FIG. 2 is a schematic diagram of a long polynomial expression division algorithm based on an LAPR technique for hardware implementation in accordance with the present invention.

A schematic diagram of the division algorithm of the present invention based on the mathematical background as stated above is shown in FIG. 2, wherein $Q_q(x)$ and $R_q(x)$ are the quotient and the remainder, respectively, resulting from $P_q(x)/M(x)$.

Also, $P'_j(x)$ (where, q−1≧j≧0) is the sum of a 1-symbol left shift of $R_{j+1}(x)$ and $P_j(x)$.

Noticeably, the finite field arithmetic is of a modular type and has a closed property. As a result, adding two symbols or polynomials with the same degree does not produce a carry or overflow, leading to the resultant polynomial $P'_j(x)$ having the same number of elements and the same degree as those of $P_j(x)$ as the operand.

All of the other $Q_j(x)$ and $R_j(x)$ (where, q−1≧j≧0) are the quotients and the remainders, respectively, resulting from $P'_j(x)/M(x)$. These are defined respectively as partial-quotient and partial-remainder since they are the results from "partial-division".

The overall quotient of $P_q(x)/M(x)$ is the weighted sum of all the partial-quotients $Q_j(x)$ (where, q≧j≧0) from the intermediate groups and the overall remainder is the sum of the partial-remainders $R_c(x)$ from the previous group and last group $P_{-1}(x)$.

Since all of the $P_j(x)$ (where, q≧j≧0) have the same degree as that of the fundamental polynomial S(x), all of the $Q_j(x)$ and $R_j(x)$ in question can be obtained by looking the results from S(x)/M(x) using identical circuits.

A linearity of the finite field arithmetic is exploited so that the result from S(x)/M(x) can be obtained by circuits with less complexity and also by a systematic way. That is, S(x)/M(x) is the same as the linear sum of each element in S(x) divided by M(x).

Two simple examples will hereinafter be described.

First, in the case where the divisor polynomial is M(x)= $x^6+x^4+x^2+x+1$, the fundamental polynomial S(x) is 6 in degree and can be expressed by the following equation 5:

$$S(x) = \left(\sum_{i=0}^{6} s_i x^i\right) x^6 \quad \text{[Equation 5]}$$

By exploiting the linearity of the finite field arithmetic, all information necessary to the formation of "lookahead" circuits can be listed as shown in the below table 1.

TABLE 1

| Input | S (x)/x⁶ INS [6] - INS [0] | | | | |
|---|---|---|---|---|---|
| | 1000000 | 1010010 | $Q_6$ (x) | 011110 | $R_6$ (x) |
| | 0100000 | 0101001 | $Q_5$ (x) | 001111 | $R_5$ (x) |
| | 0010000 | 0010100 | $Q_4$ (x) | 101100 | $R_4$ (x) |
| | 0001000 | 0001010 | $Q_3$ (x) | 010110 | $R_3$ (x) |
| | 0000100 | 0000101 | $Q_2$ (x) | 001011 | $R_2$ (x) |
| | 0000010 | 0000010 | $Q_1$ (x) | 101110 | $R_1$ (x) |

TABLE 1-continued

| | 0000001 | 0000001 | $Q_0$ (x) | 010111 | $R_0$ (x) |
|---|---|---|---|---|---|
| Output of S (x)/ M (x) | OUTQ[6]-OUTQ[0] + | | $Q_S$ (x) | OUT[5]-OUTR[O] + | $R_S$ (x) |

Superposing the results in the above table 1 with respect to each column, the following equation 6 can be obtained:

$$R_s(x), R_s(x) = r_{11}x^{11} + r_{10}x^{10} + \ldots + r_2x^2 + r_1x + r_0 \quad \text{[Equation 6]}$$

A logical expression can be obtained with respect to each coefficient as follows:

$$r_5 = s_4 + s_1, \quad \text{[Equation 7]}$$

$$r_4 = s_6 + s_3 + s_0,$$

$$r_3 = s_6 + s_5 + s_4 + s_2 + s_1,$$

$$r_2 = s_6 + s_5 + s_4 + s_3 + s_1 + s_0,$$

$$r_1 = s_6 + s_5 + s_3 + s_2 + s_1 + s_0,$$

$$r_0 = s_5 + s_2 + s_0,$$

.

.

.

In the above equation 7, each of the sj represents a coefficient of the fundamental polynomial S(x).

In result, the number of input bits required in producing each coefficient of partial-remainder is not 13 but any one of 6 to 10.

Figure 3A:
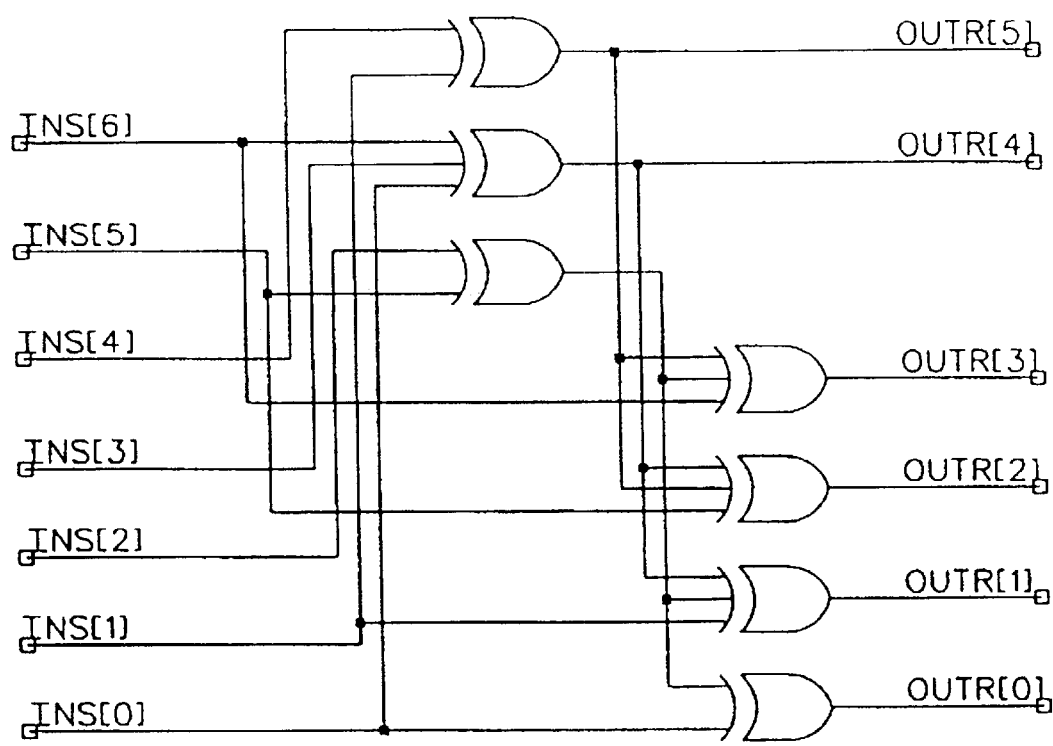
FIG. 3a is a circuit diagram showing the construction of a partial-remainder lookahead circuit in the case where coefficients are binary values, in accordance with the present invention.

Further, the number of EXOR gates necessary to the production of partial-remainder is also much more reduced because of a redundancy of the logical expression. A lookahead of partial-remainder (LAPR) circuit subjected to gate simplification is shown in FIG. 3a.

Similarly, a lookahead of partial-quotient (LAPQ) logical expression can be defined as follows:

$$q_6 = s_6 \quad \text{[Equation 8]}$$

$$q_5 = s_5,$$

$$q_4 = s_6 + s_4,$$

$$q_3 = s_5 + s_3,$$

$$q_2 = s_4 + s_2,$$

$$q_1 = s_6 + s_3 + s_1,$$

$$q_0 = s_5 + s_2 + s_0$$

In the above equation 8, each of the qj represents a coefficient of partial-quotient $Q_s(x)$ which can be expressed as follows:

$$Q_s(x) = q_6x^6 + q_5x^5 + q_4x^4 + q_3x^3 + q_2x^2 + q_1x + q_0 \quad \text{[Equation 9]}$$

Figure 3B:
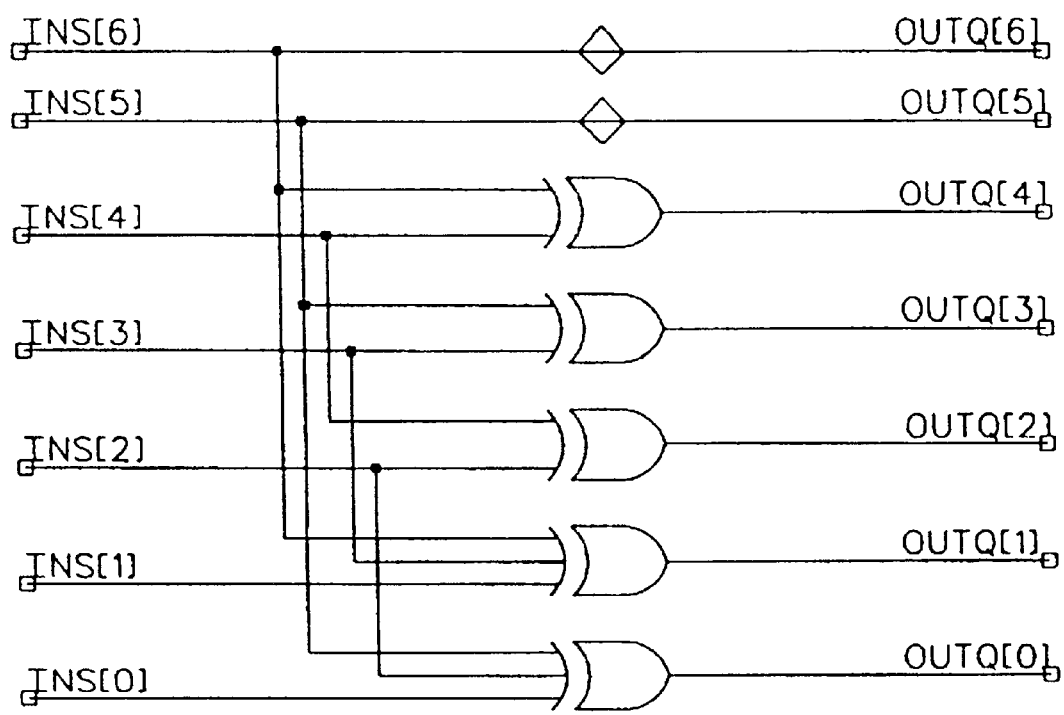
FIG. 3b is a circuit diagram showing the construction of a partial-quotient lookahead circuit in the case where coefficients are binary values, in accordance with the present invention.

Therefore, the 6-bit partial-remainder and the 7-bit partial-quotient can be expressed by possible combinations of $2^7$, the number of all cases, which can be implemented by a very simple circuit as shown in FIG. 3b.

Next, in the case where the divisor polynomial is $M(x) = x^4 + \alpha^{13}x^3 + \alpha^6 x^2 + \alpha^3 x + \alpha^{10}$ because of the presence of arbitrary coefficients on degrees other than the highest-order degree, differently from the first example, an analogous table can easily be obtained by enlarging the above-mentioned procedure with respect to each bit element. The reason is that, in a non-binary finite field, $GF(2_t)$, each symbol is composed of a sequence of t binary bits and the linearity is established with respect to each bit element.

For example, in a finite field $GF(2^4)$ where coefficients of the divisor polynomial are produced from a primitive polynomial as in the below equation 10, one symbol is composed of a sequence of four bits.

$$p(\alpha) = \alpha^4 + \alpha + 1 \qquad \text{[Equation 10]}$$

Since the linearity is present with respect to the symbol element bits, all information necessary to the formation of "lookahead" circuits can be listed as shown in the below table 2.

TABLE 2

| Input | $S(x)/x^4$<br>INS [19]–[0] |
|---|---|
| | 1000 0000 0000 0000 0000  1100 0001 1011 0101 |
| | 0100 0000 0000 0000 0000  0110 1001 1100 1011 |
| | 0010 0000 0000 0000 0000  0011 1101 0110 1100 |
| | 0001 0000 0000 0000 0000  1000 1111 0011 0110 |
| | 0000 1000 0000 0000 0000  1101 0010 0010 1001 |
| | 0000 0100 0000 0000 0000  1111 0001 0001 1101 |
| | 0000 0010 0000 0000 0000  1110 1001 1001 1111 |
| | 0000 0001 0000 0000 0000  0111 1101 1101 1110 |
| | 0000 0000 1000 0000 0000  0011 1001 0101 1001 |
| | 0000 0000 0100 0000 0000  1000 1101 1011 1101 |
| | 0000 0000 0010 0000 0000  0100 1111 1100 1111 |
| | 0000 0000 0001 0000 0000  0010 1110 0110 1110 |
| | 0000 0000 0000 1000 0000  0011 0111 1110 1110 |
| | 0000 0000 0000 0100 0000  1000 1010 0111 0111 |
| | 0000 0000 0000 0010 0000  0100 0101 1010 1010 |
| | 0000 0000 0000 0001 0000  0010 1011 0101 0101 |
| | 0000 0000 0000 0000 1000  0010 1010 1100 1101 |
| | 0000 0000 0000 0000 0100  0001 0101 0110 1111 |
| | 0000 0000 0000 0000 0010  1001 1011 0011 1110 |
| | 0000 0000 0000 0000 0001  1101 1100 1000 0111 |
| Output<br>of $S(x)/M(x)$ | OUTR [15]–OUTR [0]<br>$R_s(x)$ |

Figure 4:
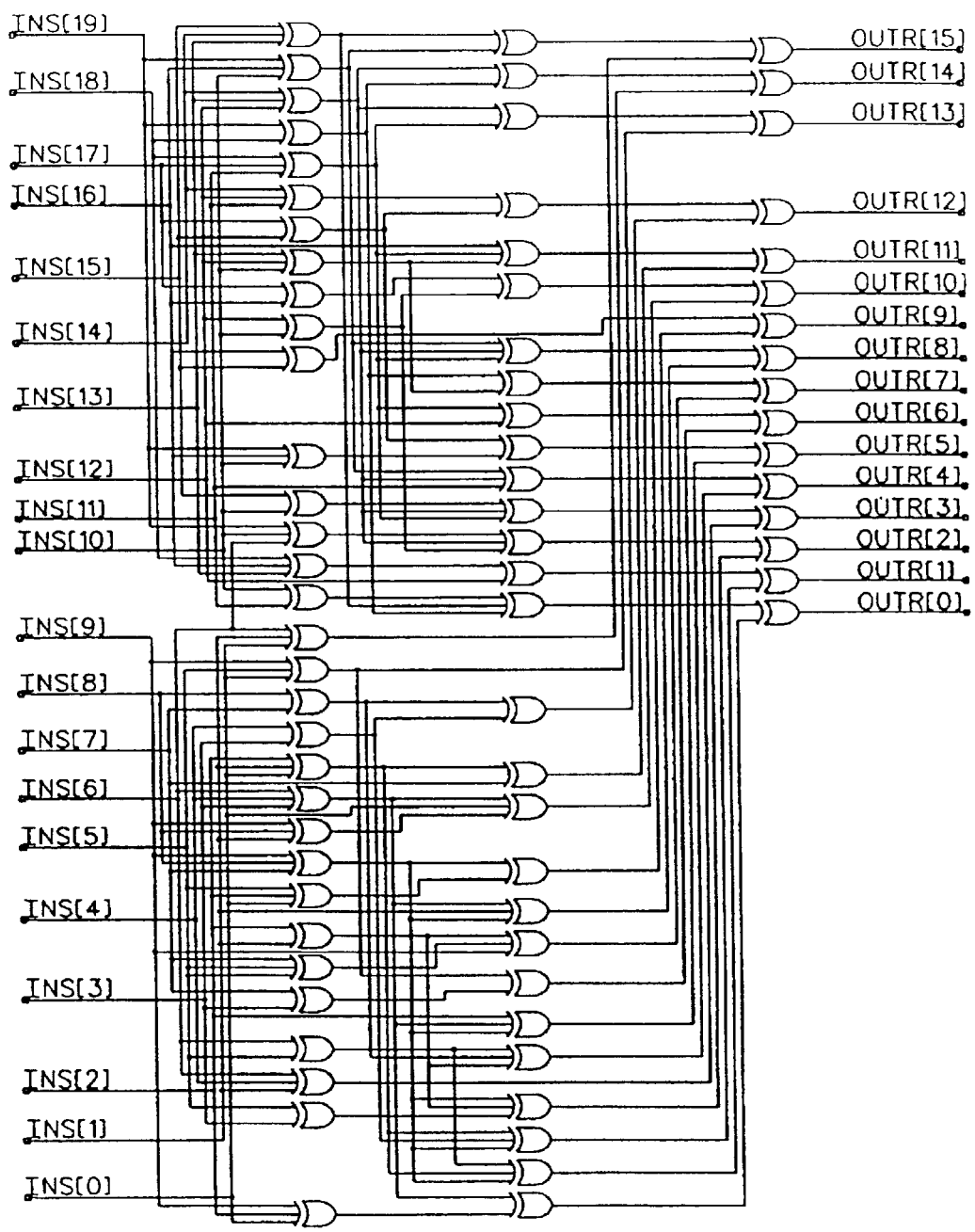
FIG. 4 is a circuit diagram showing the construction of a partial-remainder lookahead circuit in the case where coefficients are non-binary values, in accordance with the present invention.

In a similar manner to the above-mentioned first example, a logical expression is obtained with respect to each symbol element, a redundancy is removed therefrom and the results are implemented in a hardware manner, resulting in the formation of a "lookahead" circuit for partial-remainder as shown in FIG. 4.

Namely, because 4-symbol, or 20-bit partial-remainders, are 20 in number, the number of all cases is $2^{20}$. As a result, the 20-bit partial-remainders can be expressed by possible input combinations of $2^{20}$, which can be implemented by a very simple circuit as shown in FIG. 4.

One last thing to notice is that, since the LAPR-based division algorithm does not require partial-quotients to advance the division process, the partial-quotient lookahead circuitry can be completely eliminated unless application fields need quotient explicitly.

Now, a description will be given of VLSI/hardware architectures. The VLSI/hardware architectures to be implemented may generally be classified into a pipelined architecture and a sequential architecture, which will hereinafter be mentioned with reference to FIGS. 5 to 7.

First, the pipelined architecture can be implemented by fully pipelining the LAPR division algorithm on the basis of its inherent regularity and feedforward natures. This pipelined architecture can generate one quotient and one remainder per clock cycle regardless of the degree of the dividend polynomial.

Figure 5:
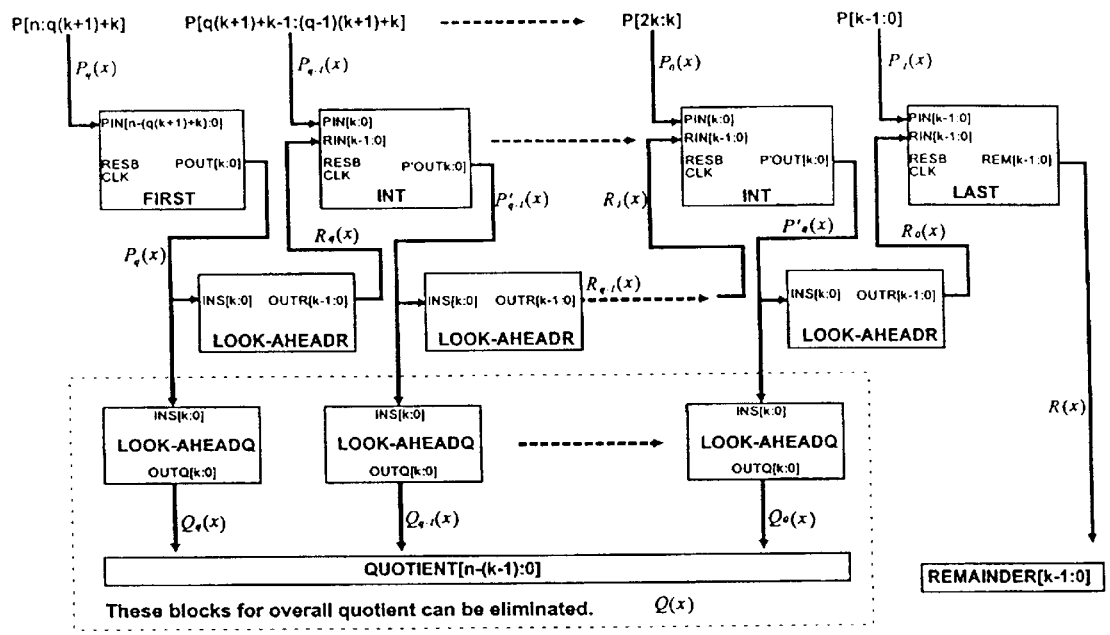
FIG. 5 is a block diagram of a pipelined division architecture based on the LAPR technique in accordance with the present invention.

FIG. 5 is a block diagram of the pipelined architecture based on the LAPR technique. Here, a block "FIRST" is a register for the first group $P_q(x)$. Also, q identical blocks "INT" are intermediate group registers, which form new intermediate groups $P'_j(x)$ (where, $q-1 \geq j \geq 0$) by adding the partial-remainders from the previous group and input group $P_j(x)$.

A block "LAST" is a remainder register. Adding the partial-remainders from the previous group $P'_0(x)$ and last group $P_{-1}(x)$ forms the overall remainder. There are (q+1) identical blocks "LOOK-AHEADQ" and "LOOK-AHEADR" that generate the partial-quotient and partial-remainder of $P'_j(x)/M(x)$, respectively, on the basis of elements in the groups.

Figure 6:
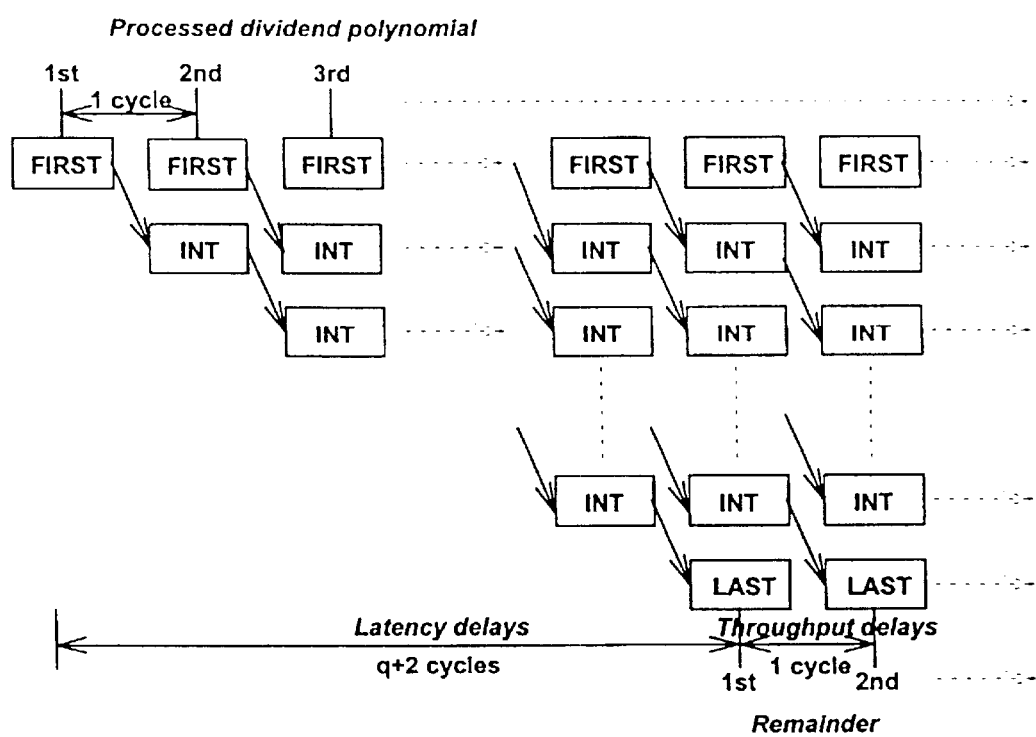
FIG. 6 is a block diagram illustrating the operation of the pipelined division architecture in FIG. 5.

FIG. 6 is a block diagram illustrating the operation of the pipelined architecture in FIG. 5.

Groups in the dividend polynomial are inserted one by one sequentially into their own specific stages from the first to the last. Each group in the next dividend polynomial can be inserted as soon as the group of the present dividend polynomial of that stage is processed. After (q+2) cycles, all the blocks in FIG. 5 operate simultaneously so that the throughput of this pipelined architecture is one remainder and one quotient per clock cycle.

As a result, the latency delay of this pipelined architecture is q+2 cycles and the throughput thereof is one remainder and one quotient per clock cycle.

Figure 7:
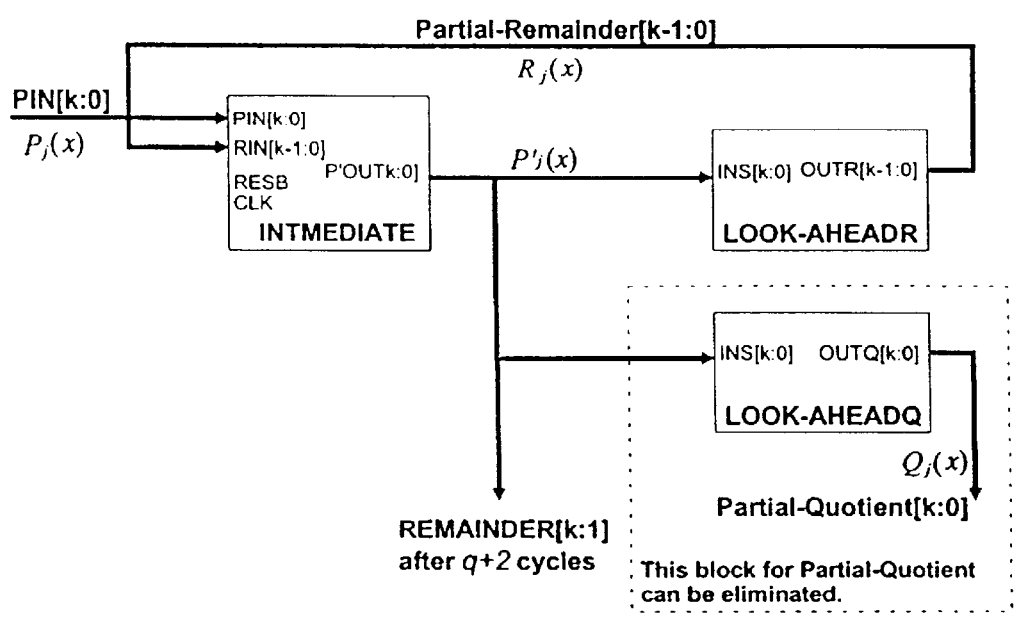
FIG. 7 is a block diagram of a sequential division architecture based on the LAPR technique in accordance with the present invention.

The sequential architecture is shown in block form in FIG. 7. As shown in this drawing, the sequential architecture occupies an efficient area. That is, the sequential architecture comprises a group register block "INT", a block "LOOK-AHEADR" for generating the partial-remainder, and a block "LOOK-AHEADQ" for generating the partial-quotient. The blocks LOOK-AHEADR and LOOK-AHEADQ may be used in the same manner as those in the pipelined architecture.

Groups in the dividend polynomial are inserted one by one sequentially into the group register from the first to the last. As a result, after (q+2) cycles, one remainder and one quotient are produced. The unit block is recursively used to perform the consecutive steps of the LAPR division algorithm, thereby allowing the area being used to be reduced to about 1/(q+1) that of the pipelined architecture. For every (q+2) cycles, one remainder and one quotient are produced. Although the sequential architecture is slower than the pipelined architecture, it is still faster than any other division architecture ever reported.

As stated previously, the partial-quotient lookahead circuitry can be completely eliminated from FIGS. 5 and 7 unless application fields need quotient explicitly.

Now, a detailed description will be given of the blocks in FIGS. 5 and 7 with reference to FIGS. 8a to 8c.

Figure 8A:
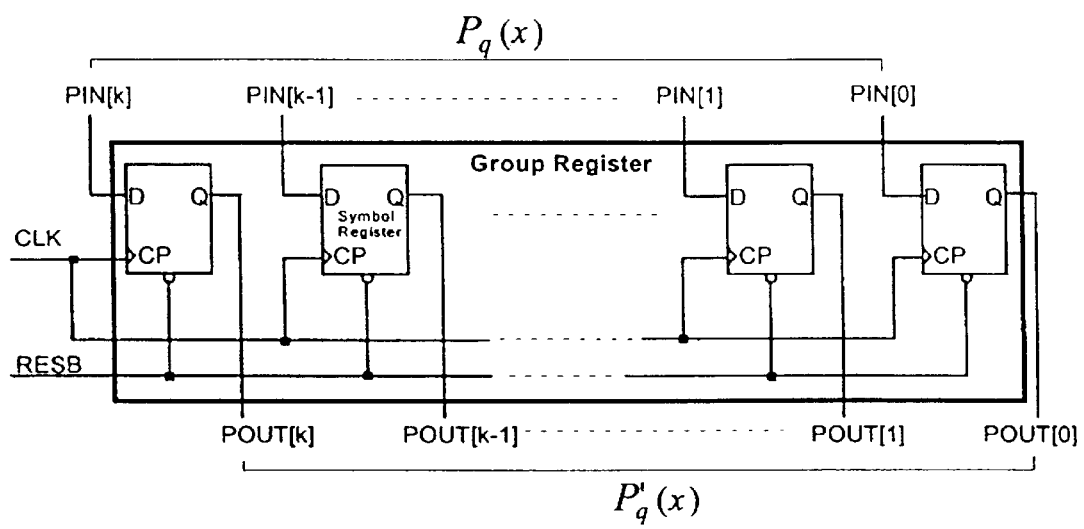
FIGS. 8a to 8c are detailed block diagrams of components in the pipelined and sequential division architectures in FIGS. 5 and 7.

The block FIRST is shown in detail in FIG. 8a. As shown in this drawing, the block FIRST includes k+1 symbol registers for storing the first group of the dividend polynomial. In the binary field, each symbol register is provided with one D flip-flop because one symbol is composed of one bit. In the non-binary finite field, each symbol register is provided with t D flip-flops connected in parallel, where "t" is the number of bits forming one symbol.

Figure 8B:
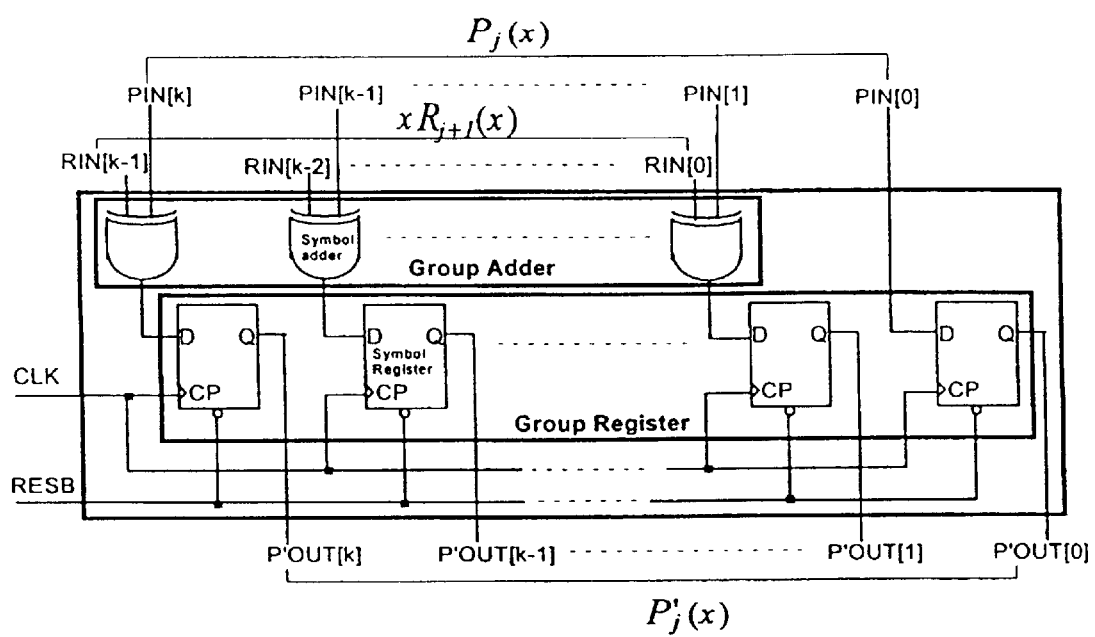

The block INT is shown in detail in FIG. 8b. As shown in this drawing, the block INT includes k+1 symbol registers and k symbol adders, for forming a new intermediate group by adding the partial-remainders from the previous group and current group. The symbol adder is a finite field adder using an EXOR (exclusive OR) gate. A new intermediate group is formed by adding the partial-remainder of k symbols from the previous group to the high-order kth symbol of the current group consisting of k+1 symbols. Namely, this is the sum of a 1-symbol left shift of the partial-remainder of the previous group and the partial-remainder of the current group.

Figure 8C:
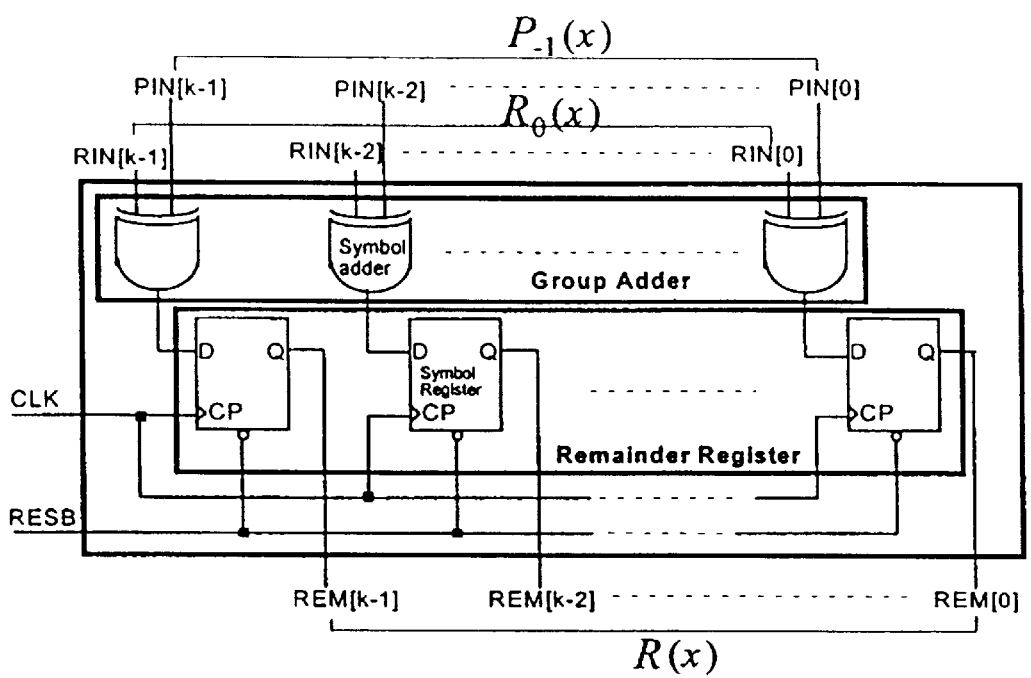

The block LAST is shown in detail in FIG. 8c. As shown in this drawing, the block LAST includes k symbol registers and k symbol adders. The overall remainder is formed by adding the partial-remainders from the previous group and last group.

The blocks LOOK-AHEADQ and LOOK-AHEADR produce the partial-quotient and the partial-remainder, respectively, as stated previously. Here, the partial-quotient and partial-remainder are obtained from the divisor polynomial and fundamental polynomial on the basis of the linearity of the finite field arithmetic.

Experimentally dividing a long polynomial expression using the above-mentioned hardware, the results are summarized as follows.

BCH/RS encoding is performed using the remainder obtained from the long polynomial expression division, wherein a polynomial of long information is the dividend polynomial and a polynomial with a generator polynomial determined is the divisor polynomial.

Hence, the architectures shown in FIGS. 5 and 7 can be used for the BCH/RS encoding without any modification. Further, LAPQ circuitry can completely be removed from a BCH/RS encoder.

The long polynomial expression division is also exploited for the syndrome generation of a BCH/RS decoder. That is, taking a transmitted codeword as the dividend polynomial and a minimal polynomial, which is a factor of a generator polynomial, as the divisor polynomial, an accurate syndrome value can be produced by the LAPR hardware with no LAPQ circuitry.

Figure 9A:
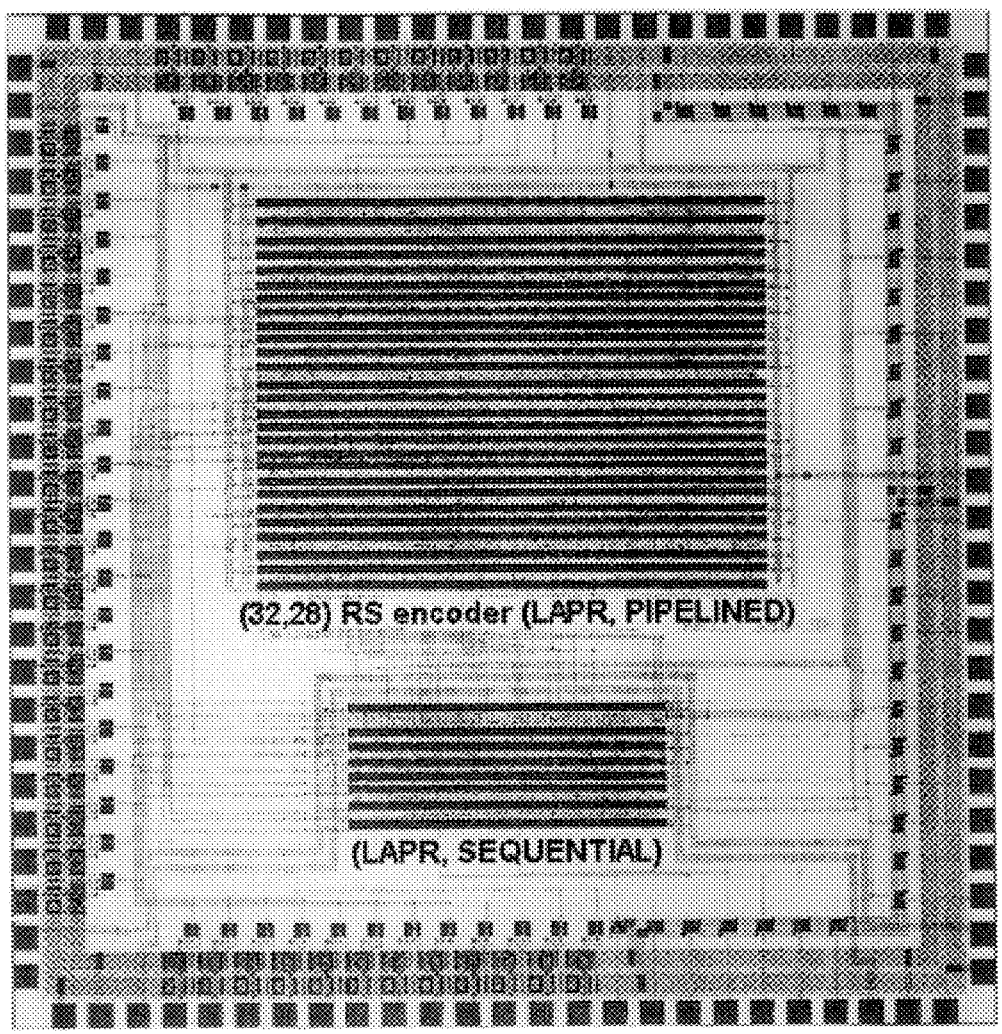
FIGS. 9a and 9b are views showing photo micrographs of chips fabricated using the present invention.
Figure 9B:
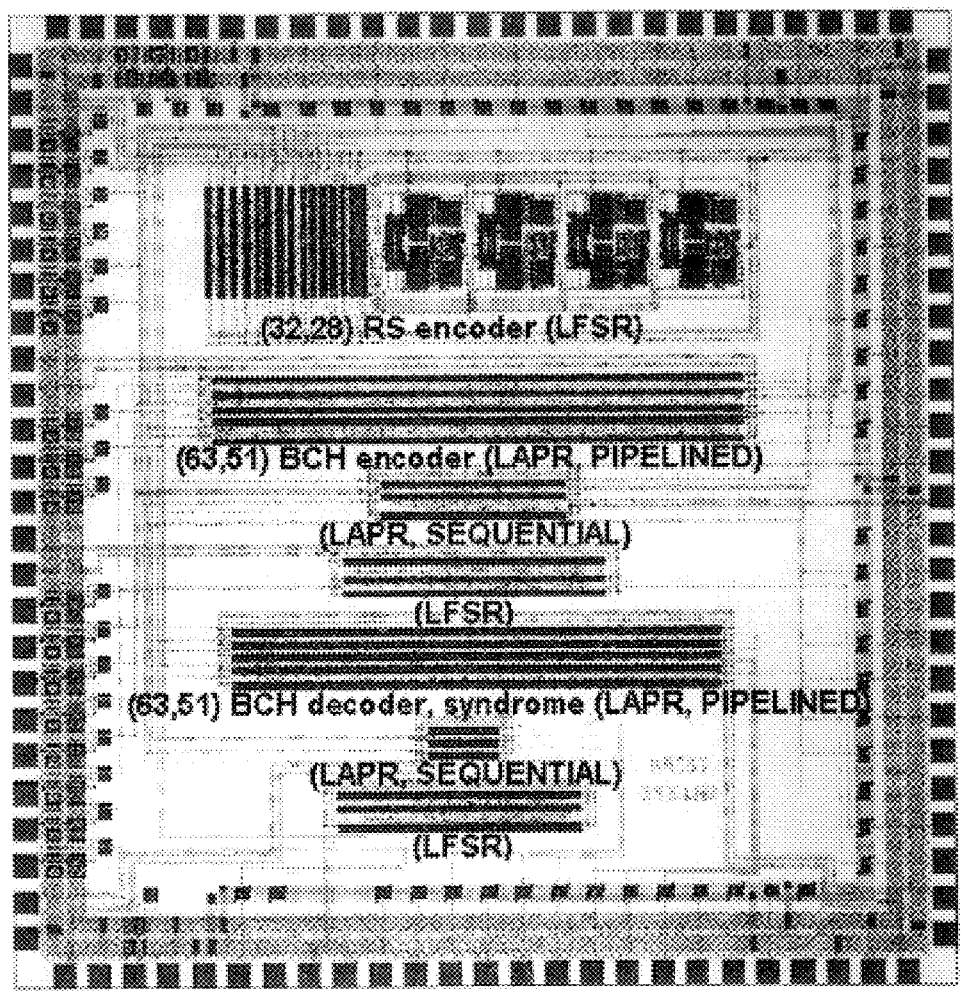

In order to show the superiority of the proposed LAPR-based architecture as compared with the conventional one using the linear feedback shift register (LFSR), in terms of speed, area and power consumption, three BCH/RS coding applications were designed in a COMPASS ASIC development environment using 0.8 $\mu$m double metal CMOS technology and fabricated into two chips. These applications: 1) (32, 28) RS encoder, 2) (63, 51) BCH encoder and 3) syndrom generator for (63, 51) BCH decoder were designed as benchmark circuits to verify the relative performance of the proposed division architecture over the conventional LFSR one. The (32, 28) RS code in GF($2^m$) and the (63, 51) BCH code are now being used in a cross interleaved Reed-Solomon code (CIRC) C1 which is a compact disk (CD) error correction code and an advanced mobile phone service (AMPS) cellular phone, respectively. The chip micro-photographs are shown in FIGS. 9a and 9b.

The experimental results are summarized in the below table 3.

TABLE 3

| Architecture (Throughput 500K division/sec) | Clock frequency | Delays (cycle) | Power Consumption @VDD = 5 V | Minimum Power Consumption | Multipliers used | Size (mm) | Number of transistor |
|---|---|---|---|---|---|---|---|
| 1) (32, 28) RS code = Error correction code of Compact Disk, encoder Divisor polynomial: M (x) = (x + $\alpha^0$) (x + $\alpha^1$) (x + $\alpha^2$) (x + $\alpha^3$) Degree of dividend: 31, The finite field used: GF ($2^8$) | | | | | | | |
| Pipelined (LAPR) | 0.5M | 1 | 4.186 mW | 1.051 mW @2.5 V | Not used | 2.50 × 1.89 | 34891 |
| Sequential (LAPR) | 3.5M | 7 | 7.201 mW | 2.422 mW @2.9 V | Not used | 1.56 × 0.85 | 6702 |
| Serial (LFSR) | 16M | 32 | 72 mW | 33.29 mW @3.4 V | ROM | 3.35 × 0.78 | 4207 + 4 × ($2^8$ × 8) ROM |
| 2) (63, 51) BCH code = Error correction code of AMPS, encoder Divisor polynomial: M (x) = $x^{12}$ + $x^{10}$ + $x^8$ + $x^5$ + $x^4$ + $x^3$ + $x^2$ + 1 Degree of dividend: 62, The finite field used: GF (2) | | | | | | | |
| Pipelined (LAPR) | 0.5M | 1 | 0.557 mW | 0.118 mW @2.3 V | — | 2.71 × 0.35 | 6852 |
| Sequential (LAPR) | 3M | 6 | 1.210 mW | 0.352 mW @2.7 V | — | 0.94 × 0.21 | 1455 |
| Serial (LFSR) | 31.5M | 63 | 15.81 mW | 7.747 mW @3.5 V | — | 1.34 × 0.21 | 2018 |
| 3) (63, 51) BCH code, syndrome generator as a decoder building block Divisor polynomial: M (x) = $x^6$ + $x^4$ + $x^2$ + x + 1 Degree of dividend: 62, The finite field used: GF (2) | | | | | | | |
| Pipelined (LAPR) | 0.5M | 1 | 0.509 mW | 0.107 mW @2.3 V | — | 2.50 × 0.31 | 6085 |
| Sequential (LAPR) | 5.5M | 11 | 0.815 mW | 0.255 mW @2.8 V | — | 0.36 × 0.16 | 526 |
| Serial (LFSR) | 31.5M | 63 | 14.81 mW | 7.258 mW @3.5 V | — | 1.25 × 0.21 | 1958 |

A clock frequency used to obtain the same throughput is shown in the second column. Power consumption at a supply voltage of 5V is measured and listed in the fourth column. It indicates that the pipelined architectures based on the LAPR algorithm show 17, 28 and 29 times improvements in power consumption as compared with the conventional LFSR-based architectures, respectively. The corresponding improvements for the sequential architectures based on the LAPR algorithm are 10, 13 and 18, respectively.

In order to show the power reduction that can be obtained by the architecture driven voltage scaling, power consumption was measured at the minimum supply voltage at which circuits are in proper operation. Since reducing the supply voltage comes at the cost of increased gate delays, as the used clock speeds are higher, lower functional throughput is inevitable. As a result, more power saving can be attained when circuits operate at lower operating frequencies. The fifth column shows the minimum power consumption under the condition that even the architecture driven voltage scaling is considered. Namely, it indicates the minimum supply voltage and the associated power consumption, measured when the same throughput is obtained.

Figure 10:
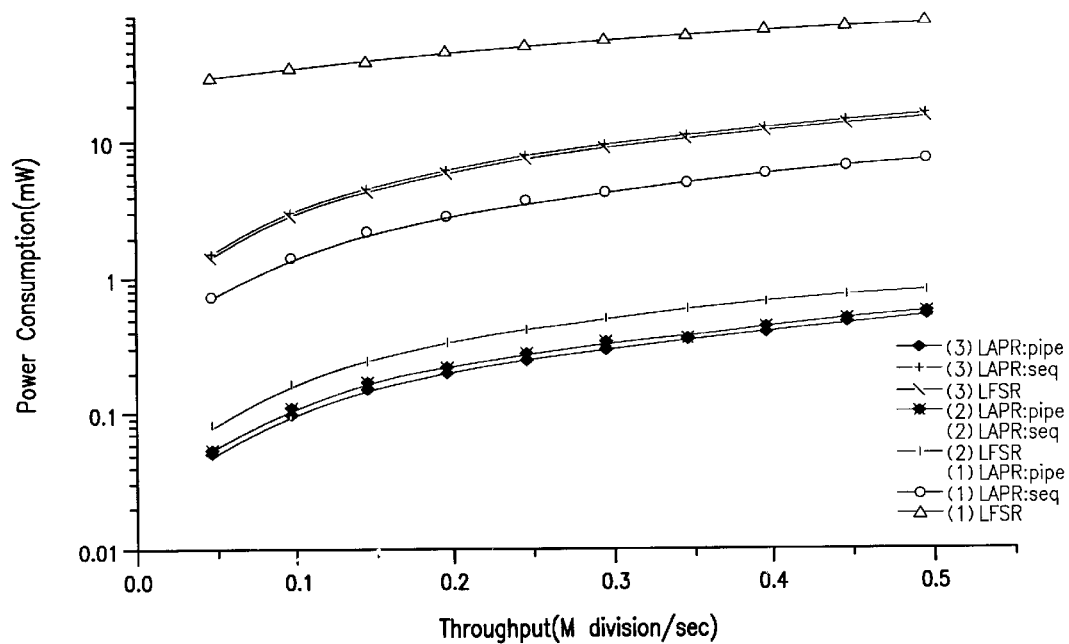
FIG. 10 is a graph showing the simulated results of throughput and power consumption.

It can be seen from the measured results that the pipelined architectures based on the LAPR algorithm show 32, 65 and 67 times improvements in power consumption as compared with the conventional LFSR-based architectures, respectively. The corresponding improvements for the sequential architectures based on the LAPR algorithm are 14, 22 and 28, respectively. The relation between the desired throughput and power consumption is illustrated in FIG. 10. Although not shown in FIG. 10, the same linear relation as that in this drawing is anticipated between the used clock frequency and power consumption because a linearly proportional relation is present therebetween. The used clock frequency can easily be calculated from the throughput delay in the third column of the table 3 and the desired throughput.

As inferred from this point of view, the conventional LFSR-based architecture cannot be fabricated with low-cost silicon processing unless it is applied with a special clocking strategy. For reference, frequency limits used in the low-cost silicon processing are about 100~200 MHz.

Figure 11:
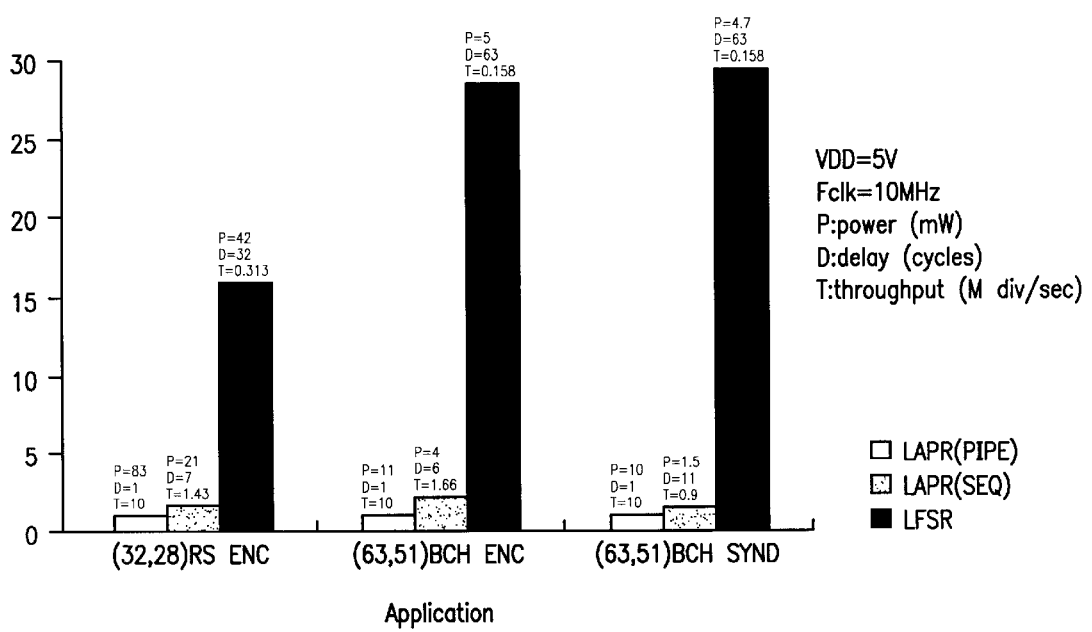
FIG. 11 is a graph showing a power-delay product normalized for benchmark circuits.

A normalized power-delay product is depicted in FIG. 11 to show the power efficiency in terms of the energy aspect. All the circuits are in operation at a supply voltage of 5 V and a clock frequency of 10 MHz. As seen from this drawing, the pipelined and sequential architectures based on the LAPR algorithm have a very small power-delay product as compared with the conventional LFSR-based architectures. Also, at the identical clock frequency, the pipelined and sequential architectures based on the LAPR algorithm produce orders of magnitude with a big boost in speed for very little power cost.

The relation between the speed and power-cost is illustrated in the below table 4.

TABLE 4

| | Speed | Power-cost |
|---|---|---|
| Pipelined Architecture Application | | |
| (32,28) RS Encoder | 32 | 2 |
| (63,51) BCH Encoder | 63 | 2.2 |
| (63,51) BCH Syndrome | 63 | 2.1 |
| Sequential Architecture Application | | |
| (32,28) RS Encoder | 4.5 | 0.5 |
| (63,51) BCH Encoder | 10.5 | 0.8 |
| (63,51) BCH Syndrome | 5.7 | 0.3 |

As seen from the above table 4, at the identical clock frequency of 10 MHz, the pipelined architectures show speeds which are 32 and 63 times as high as those of the conventional LFSR-based architectures, and power-costs which are merely 2, 2.2 and 2.1 times as high as those of the conventional LFSR-based architectures, respectively. The sequential architectures show speeds which are 4.5, 10.5 and 5.7 times as high as those of the conventional LFSR-based architectures, and power-costs which are 0.5, 0.8 and 0.3 times as low as those of the conventional LFSR-based architectures, respectively. Therefore, the pipelined and sequential architectures based on the LAPR algorithm can accomplish the high operation speed and low power consumption at one time or selectively as needed.

As apparent from the above description, according to the present invention, the group-based parallel processing operation can be performed on the basis of the technique called "lookahead of partial-remainder (LAPR)", resulting in no inter-symbol multiplication being required in the finite field, leading to a highly increased throughput per unit time as compared with the conventional one.

Further, lowering a clock frequency being used enables a trade-off between the high operation speed and the low power consumption. The use of the lowered clock frequency also allows a supply voltage to be reduced, resulting in a larger amount of power consumption being saved.

Moreover, because the enhanced speed is several times as high as that of the conventional one, the overall power-delay product becomes very small so that it can be used in an environment requiring both the high operation speed and low power consumption or an environment requiring any one thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for dividing a long polynomial expression in a finite field, comprising the steps of:

a) grouping elements in a dividend polynomial into a plurality of groups;

b) combining said groups according to a superposition of said finite field; and c) performing a group-based parallel processing operation with respect to the combined results on the basis of a lookahead technique and a partial-division process to sequentially remove said groups up to the last one for inter-symbol division in said finite field.

2. An apparatus for dividing a long polynomial expression in a finite field, which performs a group-based parallel processing operation on the basis of a lookahead technique and a partial-division process to sequentially remove groups in a dividend polynomial up to the last one for inter-symbol division in said finite field, comprising:

first group storage means for storing the first one of said groups, said first group storage means including k+1 first symbol registers, each of said first symbol registers including a D flip-flop on the basis of the fact that one symbol is composed of one bit in a binary field;

X intermediate group storage means, each of said intermediate group storage means including k first symbol adders for adding partial-remainders from the previous and current groups, k second symbol registers for storing outputs of said first symbol adders, respectively, and a third symbol register for storing a lowest-order symbol from the current group;

remainder generation means for adding partial-remainders from the previous and last groups to generate the overall remainder, said remainder generation means including k second symbol adders for adding the partial-remainder from the previous group and current group, and k fourth symbol registers for storing outputs of said second symbol adders, respectively;

X+1 partial-quotient generation means connected respectively to said first group storage means and said X intermediate group storage means for generating partial-quotients in response to output data from said first group storage means and intermediate group storage means; and X+1 partial-remainder generation means connected respectively to said first group storage means and said X intermediate group storage means for generating partial-remainders in response to input data to said X+1 partial-quotient generation means, transferring the generated partial-remainders respectively to said intermediate group storage means which are arrayed on the same lines as those thereof, and transferring the lowest-order one of said partial-remainders to said remainder generation means.

3. An apparatus for dividing a long polynomial expression in a finite field, which performs a group-based parallel processing operation on the basis of a lookahead technique and a partial-division process to sequentially remove groups in a dividend polynomial up to the last one for inter-symbol division in said finite field, comprising:

intermediate group storage means including k symbol adders for adding partial remainder from the previous group and current group, k first symbol registers for storing outputs of said symbol adders, respectively, and a second symbol register for storing a lowest-order symbol from the current group;

partial-quotient generation means connected to said intermediate group storage means for generating partial-quotients in response to output data from said intermediate group storage means; and partial-remainder generation means connected to said intermediate group storage means for generating partial-remainders in response to input data to said partial-quotient generation means and feeding the generated partial-remainders back to said intermediate group storage means.

* * * * *